W. BOWIE.
POULTRY DRINKING FOUNTAIN.
APPLICATION FILED MAY 4, 1911.
1,023,240.
Patented Apr. 16, 1912.
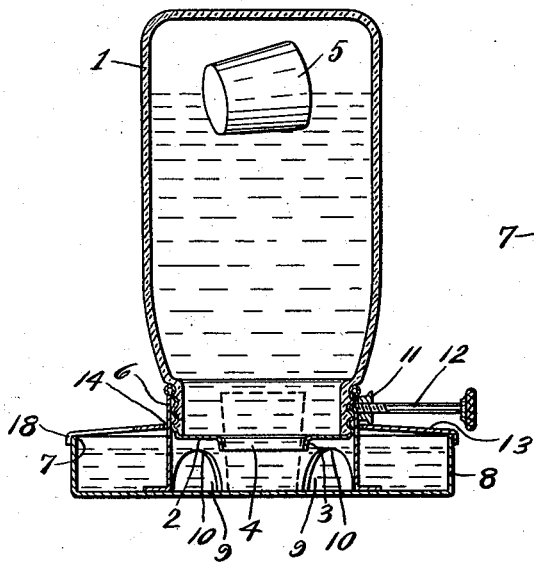
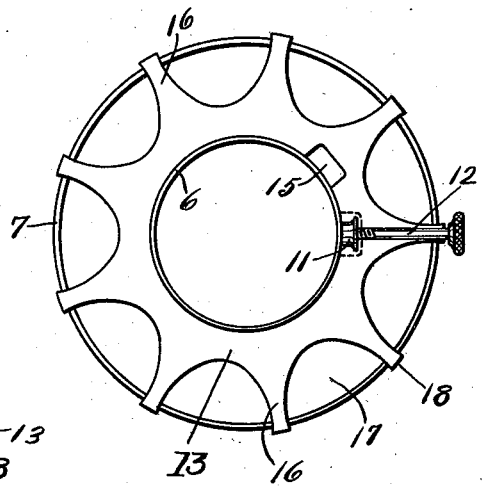
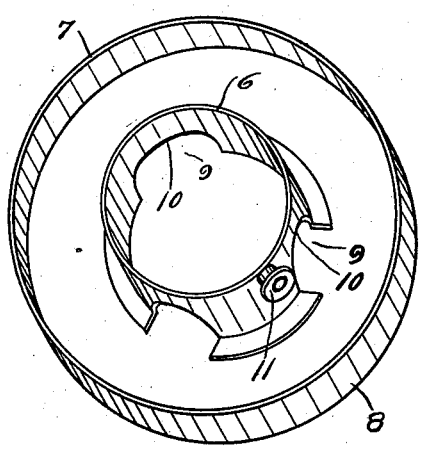
William Bowie, Inventor
Witnesses
By John L. Young
his Attorney
COLUMBIA PLANOGRAPH CO., WASHINGTON, D. C.

UNITED STATES PATENT OFFICE.

WILLIAM BOWIE, OF MANSFIELD, OHIO.

POULTRY DRINKING-FOUNTAIN.

1,023,240.  Specification of Letters Patent.  Patented Apr. 16, 1912.

Application filed May 4, 1911. Serial No. 625,052.

*To all whom it may concern:*

Be it known that I, WILLIAM BOWIE, a citizen of the United States of America, residing at Mansfield, in the county of Richland and State of Ohio, have invented certain new and useful Improvements in Poultry Drinking-Fountains, of which the following is a specification.

My invention relates to improvements in poultry drinking fountains, and has for one of its objects the production of a drinking fountain that will prevent young chicks from getting into the water, thus chilling them in cool weather thereby stunting their growth; another object is to prevent the fowls getting their gills wet, as the gills when wet will readily freeze in cold weather, thus causing the laying hens to stop laying; another object is to provide an indicating means by which the amount of water in the receptacle can be readily detected at a distance from the fountain; another object is to provide means by which the water pan may be readily cleaned.

These and other objects are attained by the construction and arrangement of the combination of parts hereinafter fully described, and illustrated in the accompanying drawings, in which:—

Figure 1 is a vertical sectional elevation of my improved drinking fountain. Fig. 2 is a top plan view of the same, with the water receptacle removed, and Fig. 3 is a perspective view of the water pan.

In the drawings, reference numeral 1 indicates an ordinary and commonly used fruit jar, or other suitable receptacle of transparent material, which is provided with a removable cover 2, having the downwardly depending flange portion 3 forming the aperture or outlet 4, in which is fitted a stopper or valve 5 with its larger end projecting inwardly into the receptacle 1.

The valve 5 is made of material having very light specific gravity, such as cork, and so arranged that when the receptacle is placed in position, the outer extremity of the valve will be pressed against the inner face of the bottom of the pan, thus forcing it upwardly into the receptacle, and by reason of its light specific gravity, it will readily rise to the top of the water and float, as shown in Fig. 1.

The outer periphery of the cover 2 is closely fitted to the inner periphery of the sleeve 6, the latter secured at the center of the water pan 8 serving to support the receptacle 1. The sleeve 6 is made sufficiently high so that when the receptacle 1 is inserted therein, the outlet in the cover 2 will be slightly below the upper edge 7 of the water pan 8. Openings 9 are provided in the sleeve 6, to permit the passage of the water that flows from the receptacle 1 into the pan 8; the upper edge 10 of the openings 9 are also slightly below the edge 7 of the pan, and about on a line with the lower edge of the flange portion 3; the sleeve 6 may be rigidly secured to the inner face of the bottom of the pan 8 by any desired means, but is preferably mounted concentric with the rim of the pan. A nut 11 is secured to the sleeve 6 and is interiorly threaded to engage the exteriorly threaded set screw 12, which when tightened against the cover 2, serves to hold the pan 8 in engagement with the receptacle 1, while the fountain is being moved about from place to place.

A removable shield 13 is provided, having a central aperture 14 loosely fitted over the sleeve 6, and also having a slot 15 formed on the periphery of the aperture 14. The shield 13 has the outwardly projecting arms 16 formed on its perimeter, leaving alternately therewith the spaces 17, through which the fowls may drink, and which are small enough to prevent them from getting their gills into the water, as well as prevent the young chicks getting into the water.

The outer ends of the arms 16 have a substantially right angle bend 18, adapted to loosely engage the rim 7 of the pan 8. It will be observed that when the shield 13 is in the normal position, it is securely held in place by reason of its pressing against the under surface of the nut 11, as shown by Fig. 1, and also that by removing the set screw 12 and receptacle 1, and rotating the shield 13 until the slot 15 is in the position shown dotted in Fig. 2, the shield may be readily removed to facilitate cleaning the pan. The shield 13 also serves to prevent the fowls scratching litter, such as straw and the like, into the water.

To fill the fountain with water, the receptacle 1 is removed from the sleeve 6, and the cover 2 and valve 5 is removed from the receptacle 1, which is then inverted and filled to the desired amount; the valve 5 is then inserted in the outlet 4, with its larger end projecting inwardly, after which the cover 2 is secured to the receptacle 1; the receptacle may then be placed in position in the sleeve 6, and by so doing, the outer extremity or smaller end of the valve 5 will be pressed against the inner face of the bottom of the pan 8, thus forcing the valve upwardly into the receptacle, and opening the outlet 4; the water will then flow from the receptacle 1 until its level in the pan 8 rises to a point substantially on a level with the lower face of the flange portion 3, and as the water in the pan is consumed by the fowls, or evaporates, a fresh supply is automatically fed into the pan, until all of the water in the receptacle is used.

When the valve 5 is released, as hereinbefore described, it will rise to the surface of the water and float thereon, thus providing a means of detecting the amount of water in the receptacle at a greater distance than it could be otherwise detected, particularly when the receptacle has been rendered only semi-transparent, by reason of the fowls scratching dirt against it, or when it has become sweated. After the receptacle has been placed in position, the set screw 12 is tightened, and the fountain may then be moved about from place to place. It will thus be observed that I provide a drinking fountain with means for preventing the young chicks getting into the water, as well as preventing the fowls getting their gills wet, which is simple and compact in construction, and which can be moved about from place to place, and having provision for readily removing the parts to facilitate cleaning the water pan; and also having means for detecting the amount of water in the receptacle at a great distance from the fountain, which is very desirable, as this may be done with my improved fountain without entering the inclosure within which the fowls are kept.

Having thus fully described my invention, what I claim and desire to secure by Letters Patent is:—

1. A poultry drinking fountain, comprising a transparent water receptacle provided with a removable cover, said cover having a flange portion provided in the bottom thereof, forming an outlet for the water in the receptacle; a floating valve for closing the outlet; a pan having a sleeve mounted within, and concentric with the rim thereof, said sleeve being adapted to support the water receptacle; fastening means for removably securing the receptacle to the sleeve, said fastening means comprising a nut secured to the sleeve and a set screw threadably engaging the same, and a removable shield, having arms and spaces alternated on its perimeter, engaging the sleeve and overlying the pan, to partially cover the same, substantially as, and for the purpose set forth.

2. In a poultry drinking fountain, the combination with a pan, having a sleeve mounted therein, said sleeve being concentric with the rim thereof, and a water receptacle supported by the said sleeve, of a removable cover for the water receptacle, said cover having its outer periphery closely fitted to the inner periphery of the said sleeve, and being provided with a downwardly depending flange portion forming an outlet for the water in the receptacle, and means for removably securing the said receptacle to the said sleeve, substantially as described.

3. In a poultry drinking fountain, the combination with a pan, having a sleeve mounted therein, said sleeve being concentric with the rim thereof, and a water receptacle supported by the said sleeve, of a removable cover for the water receptacle, said cover having its outer periphery closely fitted to the inner periphery of the said sleeve, and being provided with a downwardly depending flange portion forming an outlet for the water in the receptacle, means for removably securing the receptacle to the said sleeve, said means comprising a nut secured to the sleeve and a set screw threadably engaging the same, a removable shield having a central aperture loosely engaging the said sleeve, and being adapted to normally engage the under surface of the said nut to hold the shield in position over the pan, and a slot formed on the periphery of the said aperture, by means of which the said shield may be removed, said shield having arms and spaces alternated on its perimeter, the arms having a substantially right angle bend at their outer ends adapted to loosely engage the rim of the said pan, substantially as described.

4. In a poultry drinking fountain, the combination with a pan, having a sleeve mounted therein, said sleeve being concentric with the rim thereof, and a transparent water receptacle supported by the said sleeve, of a removable cover engaging the said receptacle, and having a flange portion forming an outlet in the bottom of the said cover, and a floating valve for closing the outlet, so arranged that when the receptacle is placed in position in the sleeve, the valve will rise to the surface of the water, and the outlet will be opened, substantially as, and for the purpose set forth.

5. In a poultry drinking fountain, the combination with a pan, having a sleeve concentrically mounted therein, said sleeve having a series of openings formed therein, of a transparent water receptacle supported by the said sleeve, and having a removable cover provided therefor, said cover being provided with a flange portion on the top thereof, forming an outlet, said outlet being adapted to be closed by a floating valve, and a removable shield loosely fitted over the said sleeve, said shield having arms and spaces alternated on its perimeter to partially cover the said pan, substantially as, and for the purpose set forth.

6. In a poultry drinking fountain, the combination with a pan, having a sleeve concentrically mounted therein, of a series of openings formed in the said sleeve, the top of said openings being slightly lower than the top of the rim of the said pan, a shield having arms and spaces alternated on its perimeter, removably secured to the said sleeve and overlying the said pan, a transparent water receptacle, having a removable cover, removably secured to the said sleeve by means of a nut secured to the sleeve and a set screw threadably engaging the same, said cover depending slightly lower than the top of the rim of the said pan, and having an outlet formed in the bottom thereof, and a floating valve for closing the outlet, so arranged that when the receptacle is placed in position in the sleeve, the valve will rise to the surface of the water, substantially as, and for the purpose set forth.

In testimony whereof I affix my signature in presence of two witnesses.

WILLIAM BOWIE.

Witnesses:
DAVID BOWIE,
JOHN L. YOUNG.

Copies of this patent may be obtained for five cents each, by addressing the "Commissioner of Patents, Washington, D. C."